(12) United States Patent
Yerli

(10) Patent No.: US 11,270,513 B2
(45) Date of Patent: Mar. 8, 2022

(54) SYSTEM AND METHOD FOR ATTACHING APPLICATIONS AND INTERACTIONS TO STATIC OBJECTS

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/902,512

(22) Filed: Jun. 16, 2020

(65) Prior Publication Data
US 2020/0402313 A1      Dec. 24, 2020

Related U.S. Application Data

(60) Provisional application No. 62/863,077, filed on Jun. 18, 2019.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
CPC .......... G06N 3/08; G06N 3/04; G06T 19/006; G06F 3/011; G06F 16/687
See application file for complete search history.

(56) References Cited

U.S. PATENT DOCUMENTS 8,239,132 B2    8/2012  Ma et al.
8,564,621 B2   10/2013  Branson et al.
(Continued)

FOREIGN PATENT DOCUMENTS

WO    2016/077493 A1    5/2016
WO    2018/144315 A1    8/2018
WO    2016/077493 A8    5/2019

OTHER PUBLICATIONS

Meenakshi, V., et al., "An Innovative App With for Location Finding With Augmented Reality Using CLOUD," Proceedings of the 2nd International Symposium on Big Data and Cloud Computing (ISBCC'15); Procedia Computer Science 50:585-589, 2015.
(Continued)

*Primary Examiner* — Abderrahim Merouan
(74) *Attorney, Agent, or Firm* — Christensen O'Connor Johnson Kindness PLLC

(57) ABSTRACT

A system and method for attaching digital reality applications and interactions to static objects are disclosed. The system comprises a server configured to store and process input data, the server comprising a memory and a processor; and a plurality of client devices connected to the server via a network configured enable interaction with digital reality applications. The memory contains a database with structured data containing a persistent virtual world system storing virtual replicas of static objects. The virtual replicas are configured based on the static objects, comprising location and space, physics, and 3D structure. The system enables application developers to attach digital reality applications on the virtual replicas. When users employing client devices approach a digital reality application, the digital reality application detects the physical position and orientation of the client device, triggering the server to share digital reality application content with the client devices.

20 Claims, 4 Drawing Sheets

(56) References Cited

U.S. PATENT DOCUMENTS

| | | | |
|---|---|---|---|
| 8,681,179 | B2 | 3/2014 | Rolleston et al. |
| 9,129,429 | B2 | 9/2015 | Hammond |
| 9,142,038 | B2 | 9/2015 | Lotto et al. |
| 9,165,318 | B1 | 10/2015 | Pauley et al. |
| 9,319,835 | B2 | 4/2016 | Smith et al. |
| 9,338,599 | B1 | 5/2016 | Burgmeier et al. |
| 9,721,386 | B1 | 8/2017 | Worley, III et al. |
| 10,679,428 | B1 | 6/2020 | Chen et al. |
| 2002/0158873 | A1* | 10/2002 | Williamson ............ G06T 17/00 345/427 |
| 2005/0131607 | A1* | 6/2005 | Breed ................ B60R 21/0152 701/45 |
| 2007/0115282 | A1 | 5/2007 | Turner et al. |
| 2009/0244059 | A1 | 10/2009 | Kulkarni et al. |
| 2009/0292464 | A1 | 11/2009 | Fuchs et al. |
| 2010/0325154 | A1 | 12/2010 | Schloter et al. |
| 2012/0249416 | A1 | 10/2012 | Maciocci et al. |
| 2012/0909373 | | 12/2012 | Abogendia |
| 2013/0009994 | A1 | 1/2013 | Hill |
| 2013/0178257 | A1 | 7/2013 | Langseth |
| 2013/0194164 | A1 | 8/2013 | Sugden et al. |
| 2014/0002444 | A1 | 1/2014 | Bennett et al. |
| 2014/0114845 | A1* | 4/2014 | Rogers ................. G06Q 20/145 705/39 |
| 2014/0229542 | A1 | 8/2014 | Yu et al. |
| 2014/0282220 | A1 | 9/2014 | Wantland et al. |
| 2014/0313197 | A1 | 10/2014 | Peuhkurinen |
| 2015/0188984 | A1 | 7/2015 | Mullins |
| 2015/0235432 | A1 | 8/2015 | Brounder et al. |
| 2016/0026253 | A1 | 1/2016 | Bradski et al. |
| 2016/0104452 | A1 | 4/2016 | Guan et al. |
| 2016/0133230 | A1 | 5/2016 | Daniels et al. |
| 2017/0024093 | A1 | 1/2017 | Dziuk |
| 2017/0208109 | A1 | 7/2017 | Akselrod et al. |
| 2017/0228937 | A1 | 8/2017 | Murphy et al. |
| 2018/0204385 | A1 | 7/2018 | Sarangdhar et al. |
| 2018/0005450 | A1 | 9/2018 | Daniels et al. |
| 2018/0276891 | A1 | 9/2018 | Craner |
| 2018/0288393 | A1 | 10/2018 | Yerli |
| 2019/0102946 | A1* | 4/2019 | Spivack .................. G06F 3/017 |
| 2019/0172262 | A1* | 6/2019 | McHugh .............. G06T 19/006 |
| 2019/0361797 | A1 | 11/2019 | Yerli |
| 2019/0371073 | A1 | 12/2019 | Harviainen |

OTHER PUBLICATIONS

Hu, S., et al., "A Mobile Location-Based Architecture for Intelligent Selecting Multi-Dimension Position Data Over Internet," Sino-Korea Chongqing GIS Researcher Center, Chongqing, China; Intelligence GIS Research Center, Department of Computer Science and Engineering, Inha University, Korea, 2017, 4 pages.

Pontikakos, C., et al., "Location-Based Services: Architecture Overview," Informatics Laboratory, Agricultural University of Athens, 2017, 11 pages.

European Search Report dated Nov. 6, 2020 issued in European Application No. EP20180791.4, 11 pages.

European Search Report dated Nov. 19, 2020 issued in European Application No. EP20180898.7, 9 pages.

European Search Report dated Nov. 6, 2020 issued in European Application No. EP20180805.2, 8 pages.

European Search Report dated Oct. 21, 2020, issued in European Application No. EP20180810.2, 8 pages.

European Search Report dated Nov. 19, 2020 issued in European Application No. 20180869.8, 9 pages.

Office Action dated Jul. 8, 2021 issued in U.S. Appl. No. 16/904,163, filed Jun. 17, 2020, 14 pages.

Office Action dated Nov. 15, 2021 issued in U.S. Appl. No. 16/901,968, filed Jun. 15, 2020, 21 pages.

Office Action dated Dec. 17, 2021, issued in U.S. Appl. No. 16/902,024, filed Jun. 15, 2020, 43 pages.

* cited by examiner

SYSTEM AND METHOD FOR ATTACHING APPLICATIONS AND INTERACTIONS TO STATIC OBJECTS

CROSS-REFERENCE TO RELATED APPLICATION

This application claims the benefit of Provisional Application No. 62/863,077, filed Jun. 18, 2019, the entire disclosure of which is hereby incorporated by reference herein for all purposes.

FIELD

The present disclosure generally relates to computer systems, and more specifically to digital reality applications.

BACKGROUND

Technology developments for providing digital reality application content to users have enabled experiences that were not possible in the past. Particularly, digital realities, such as augmented reality (AR), virtual reality (VR), and mixed reality (MR), change a user's perception on what they are seeing, hearing, and feeling, and how much of the real world comes into these experiences, providing the user with a sensation of a physical presence in places in the real world or an imagined world.

Augmented reality (AR) is a live view of a real-world environment whose elements are superimposed by computer-generated objects such as video, texts or 3D computer models. AR technology can be divided into 2 categories, specifically, marker-based and markerless AR. Marker-based AR may be grouped into image-based and location-based AR. Image-based AR needs specific labels to register the position of 3D objects on the real world image. In contrast, location-based AR uses position data such as data from GPS to identify the location. Applications using location-based AR range from presenting information based on the user's position in the real world to location-aware social networks with custom proximity notification. For realistic interaction applications simulation, assembly training or educational experiments, image-based AR is preferred in some embodiments.

Current AR technology suffers several drawbacks. For example, regardless of the AR applications being configured as marker-based or marker-less based, current AR applications are usually viewed by users individually depending on the shapes for which the markers are configured and/or location where the AR applications are attached. AR applications are typically not persistent and do not take into account a mapping of all geometries of the 3D world and the virtual elements and applications interactions with these elements. Experiences are also usually individualized depending on the viewing position and orientation of a user without enabling shared experiences with other users. Furthermore, users may need to download applications that are later run directly on a user's client device, making it time-and-resource-consuming for the client devices. Finally, tracking of the viewing position and orientation of client devices is decisive on how the media streams are transferred to users. However, current tracking techniques may result inaccurate and may lead to media streams being uncoordinated with a user's movements, causing problems such as vertigo, discomfort, and resulting sometimes in low interaction times and demand for such applications.

What is desired is a system and method that enables persistent and accurate location-and-geometry based persistent positioning of applications and personal or shared interactions in the real world that takes into account the relationship with the real world.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Drawbacks disclosed in the background are addressed through embodiments of the current disclosure through systems and methods for attaching digital reality applications and interactions to static objects. The systems and methods comprise merging real and virtual realities into merged realities that involve interaction between virtual replicas of real objects, digital reality applications, and users. The systems and methods enable shared or individual experiences between users and the applications. Additionally, the systems and methods provide functionality (e.g., real-time movement and eye-tracking capabilities) that enable media streams to be provided in accordance with the position and orientation of the viewers. The static objects where digital reality applications are attached can be reached by physically going to the location of those objects or by going in virtual reality.

A system for attaching digital reality applications and interactions to static objects, according to embodiments of the current disclosure, comprises a server configured to store and process input data, the server comprising a memory and a processor; and a plurality of client devices connected to the server via a network and configured to enable interaction with one or more digital reality applications. In an embodiment, one or more servers contain a persistent virtual world system storing virtual replicas of static objects of the real world, the virtual replicas comprising settings such as the location and space, physics settings, and a 3D data structure, amongst other possible settings, based on the static objects. The persistent virtual world system is configured to virtually attach digital reality applications on the virtual replicas. In an embodiment, the system enables application developers to modify the persistent virtual world system by providing their own digital reality applications and instructing the persistent virtual world system to attach their digital reality applications on the virtual replicas.

When users employing client devices approach a location, object, or entity to which a digital reality application is virtually attached, the digital reality application detects the physical position and orientation of the client device. For example, the digital reality application may receive position and orientation data from the client devices or from other computing devices that track the position and orientation of the client devices. The digital reality application may, for example, compare the received position data with a trigger zone, triggering the server to transmit digital reality application content to the client devices that have entered the trigger zone. In an embodiment, the entry of the client devices into a trigger zone is detected by receiving a notification of the positions of the user devices and comparing the positions to a known boundary of the trigger zone.

The digital reality application content may be presented in merged reality, virtual reality, or real reality. The digital reality application content or interactions with the digital reality applications may be personal to an individual device or user, or shared with other client devices. The client devices may be one or more mobile devices, personal computers, game consoles, media centers, smart contact lenses, and head-mounted displays, which are configured to enable interactions between users and the digital reality application content via user interfaces.

The location and space are configured to allow setting up the location, relative three-dimensional position and orientation, and scaling of virtual replicas. Configuration of physics enables the specification of physical properties of the virtual replicas, such as rigid body dynamics, soft body physics, fluid dynamics, occlusion, and collision detection, amongst others. The 3D data structure refers to a data organization and storage format of 3D objects that enables efficient access and modification, including, for example, octrees, quadtrees, BSP trees, sparse voxel octrees, 3D arrays, and k-d trees.

The digital reality application is virtually attached to a place in the real world. Thus, a user not wearing or employing a client device may approach the place where the digital reality application was virtually attached without triggering any reaction in the system (i.e., not enabling the user to view the digital reality application). However, when the user activates and employs a client device, the digital reality application may detect the viewing position and orientation of the client device and may retrieve corresponding media streams aligned with the position and orientation during user interaction. In some embodiments, the digital reality application content included in the media streams includes 3D image data, 3D geometries, 3D entities, 3D sensory data, 3D dynamic objects, video data, audio data, textual data, time data, positional data, orientational data, haptic data, or lighting data, or a combination thereof.

According to an embodiment, the digital reality applications may utilize one or more of a plurality of techniques to broadcast a signal to the client devices, alerting the client devices that a digital reality application is available in proximity to the location of the client devices. In one embodiment, if the user has previously subscribed to an application in the server, the location of the client device may then at all times be available at the persistent virtual world system stored in the server. Therefore, when a user approaches a digital reality application, the digital reality application may already prepare to broadcast the signals to the client device. In another embodiment, if the user has previously subscribed to the server or to one or more specific digital reality applications from the server, the digital reality application may constantly search for registered devices prior to broadcasting the signal. In one embodiment, as a user with a client device enters a location where the digital reality application is active, the digital reality application may detect a signal from the device, indicating the device can receive a digital reality application media stream prior to broadcasting the signal.

In some embodiments, when the user employs the digital reality device, the user may select to view the elements in merged reality or virtual reality. In merged reality, the user may view the real world elements plus the one or more applications virtually attached thereon along with one or more other virtual elements. Thus, merged reality comprises physical, real-world environment elements augmented by computer-generated input such as sound, video, graphics, and GPS or other tracking data. Augmentation techniques are typically performed in real-time and in semantic context with environmental elements, such as overlaying supplemental information or virtual objects in the real world. The merged reality content allows information about the surrounding real world of the user or virtual objects overlay in the real world to become interactive and digitally manipulable. In virtual reality, the user may view the same static objects in a virtualized way, replacing the real world with a simulated one. For example, the user may, from his home location, be able to select a remote location and explore that location in order to find the one or more digital reality applications and interact with them.

In some embodiments, the user may not need to download the digital reality application in order for the applications to become visible or accessible to the user. Instead, the server may directly retrieve application graphical representations from the server and, if levels of interaction increase, perform remote computing and rendering for the client device, which may only need to perform lightweight computations in order to display the digital reality content. In other embodiments, the client device may, after pre-determined levels of interaction, download the application or parts of the application and perform client-side computations and rendering.

According to an embodiment, the digital reality applications may be developed via one or more third-party 3D engines, local 3D engines, or combinations thereof. Likewise, the virtual replicas may be developed via a plurality of developers from one or more sources. As all the information is included in the server, the user is able to view all applications and virtual replicas, independent of the development software used and the source of the developers. Therefore, a user looking in one direction including a plurality of applications developed via different sources may view the plurality of applications and may be able to interact with them. Likewise, a user may be able to view some or all of the interactions of other users with respective applications, depending on the level of privacy and depth of the interactions.

Virtualizing the real world before attaching the digital reality applications to corresponding static objects allows application developers to utilize the location including position and orientation of the virtual replicas when attaching the applications. In addition, effects such as collisions and occlusion between static objects and digital elements may be enabled in a more realistic way, as each static object is stored as a virtual replica in the server. For example, digital reality applications may be occluded by real-world objects because the virtual replicas corresponding to the real-world objects may prevent a user from viewing the digital reality applications, enabling a realistic effect.

According to an embodiment, the virtual replicas are created via readily-available computer-assisted drawing (CAD) or computer-assisted engineering (CAE) models of the static objects. For example, machine owners may provide an administrator of the persistent virtual world system or may input by themselves the already-existing digital CAD or CAE models of their machines. Similarly, building owners may provide building information models (BIM) with building details to be stored in the persistent virtual world system, which may include information that may not be visible or easily obtainable via sensing mechanism. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging, such as synthetic-aperture radars, real-aperture radars, AVTIS radars, Light Detection and Ranging (LIDAR), inverse aperture radars, monopulse radars, and other types of imaging techniques may be used to map and model static objects before integrating them into the persistent virtual world system. Utilizing these more technical solutions may be performed especially in cases where the original models of the structures are not available, or in cases where there is missing information or there is a need to add additional information to the virtual world entities which is not provided by the CAD models.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G). In other embodiments, the system may connect through wireless local area networking (Wi-Fi), which may provide data at 60 GHz. Provided communication systems may allow for about 1 to about 5 millisecond end-to-end (E2E) latency and 1-10 Gbps downlink speeds to end points in the field, complying with parameters necessary for executing the typically highly-interactive applications. This results in high-quality, low latency, real-time digital application content streaming In other embodiments, the system may communicatively connect through 4th generation wireless systems communication (4G), may be supported by 4G communication systems, or may include other wired or wireless communication systems.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

According to an embodiment, the sensing mechanisms mounted on the connected devices include a combination of inertial tracking sensing mechanisms and transceivers. The inertial tracking sensing mechanisms can make use of devices such as accelerometers and gyroscopes, which may be integrated in an inertial measuring unit (IMU). Accelerometers measure linear acceleration, which can be integrated to find the velocity and then integrated again to find the position relative to an initial point. Gyroscopes measure angular velocity, which can be integrated as well to determine angular position relatively to the initial point. Additional accelerometers and gyroscopes separate from the IMU may also be incorporated. The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

By way of example, the digital reality application is virtually attached to a static shoe placed in a specific place in a park. Without the client device, the user may only view a shoe, but when the user employs the client device, the user may view a digital reality application that may be represented by the shoe glowing or emitting a sound. The user may be alerted by the digital reality application about the presence of the digital reality application and the user may thereafter touch a virtual, graphical representation of the same, which may trigger other forms of interaction. For example, after the user touches the graphical representation of the digital reality application, the graphical representation may increase in size, may enable the user to rotate the shoe, view the shoe characteristics in the form of text, view videos about the shoe, change some characteristics of the shoe, such as color, size, or style, and may purchase the selected shoe. The shoe may remain in the specific place in the park or elsewhere until decided by the shoe provider, and may thereafter move the shoe to another place, for which the shoe location and space settings may need to be updated in the server. In other examples, the shoe may be viewed completely in virtual reality, such as showing the shoe in a different setting, such as in a desert, mountain, or another city.

According to an embodiment, a method for attaching digital reality applications and interactions to static object is provided. The method may be implemented in a system, such as systems of the current disclosure. The method includes providing a persistent virtual world system storing virtual replicas of static objects of the real world, the virtual replicas comprising a static object location and space, physics settings, and a 3D data structure; and virtually attaching digital reality applications to the virtual replicas, such that as a client device approaches a location, object, or entity to which a digital reality application is virtually attached, the digital reality application detects the physical position and orientation of the client device, triggering the server computer system to transmit digital reality application content to the client device.

In an embodiment, the method starts by creating, by a developer via a replica editor stored in a server, virtual replicas of static objects. Subsequently, the method continues by adding virtual replica real-world properties, including location and space settings, physics settings, and 3D data structure. Then, the method continues by attaching, by a developer via a replica editor stored in the server, digital reality applications to the virtual replicas.

In an embodiment, a user approaches and looks at a digital reality application. In some embodiments, the user may approach the digital reality application in a merged reality. In other embodiments, the user may approach the digital reality application in virtual reality. Approaching the digital reality application triggers the digital reality application to detect and track the client device position and orientation, and to send the client position and orientation to the server. The server then retrieves and tracks the viewing position and orientation from client device to thereafter send application media streams to the client device adjusted and aligned to the viewing position and orientation of the user. Finally, the user interacts with the digital reality application via the client device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
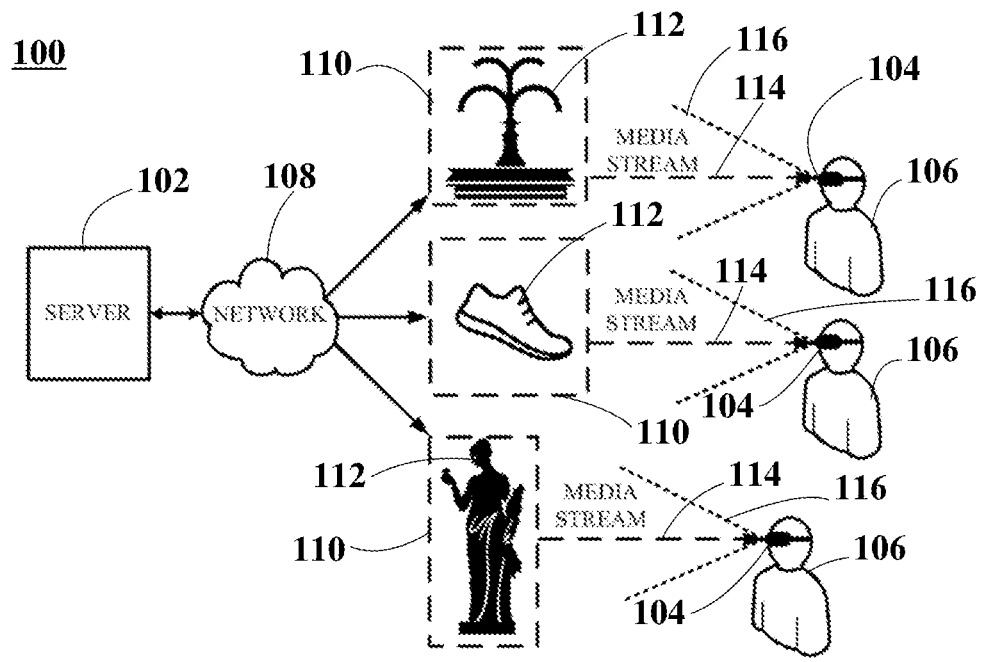
FIGS. 1A-1B depict schematic representations of a system for attaching applications and interactions to static objects, detailing one or more users viewing and interacting with one or more applications virtually attached to elements of the real world, according to an embodiment.
Figure 1B:
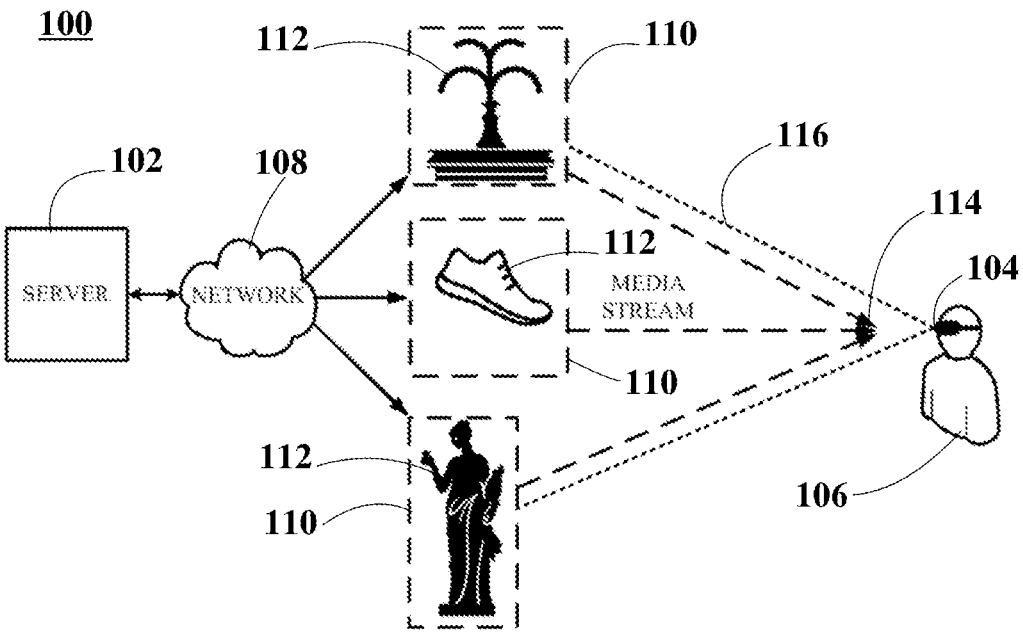

FIGS. 1A-1B depict schematic representations of a system 100 for attaching applications and interactions to static objects, detailing one or more users viewing and interacting with one or more applications virtually attached to elements of the real world, according to an embodiment.

As viewed in FIG. 1A-1B, the system 100 comprises a server 102 configured to store and process input data, and a plurality of client devices 104 employed by users 106, the client devices 104 connected to the server 102 via a network 108. The client devices 104 are configured to enable user interaction with one or more digital reality applications 110. The server 102 contains a database with structured data containing a persistent virtual world system storing virtual replicas of static objects 112 of the real world. The system 100 enables application developers to attach digital reality applications 110 on the virtual replicas. When users 106 employing client devices 104 approach one or more digital reality applications 110 virtually attached to the static objects 112, the digital reality applications 110 detect the physical position and orientation of the client device, triggering the server 102 to share digital reality application 110 content with the client devices 104. Although the system 100 is described as including a single server 102 in examples disclosed herein, it should be understood that functions described herein as being performed by a single server (e.g., server 102) may instead be performed by server system comprising multiple server computers, or vice versa.

In an embodiment, the digital reality applications 110 detect the position and orientation of the client devices 104 by receiving position and orientation data transmitted from the client devices 104 or from other computing devices that track the position and orientation of the client devices. In such an embodiment, the digital reality applications 110 may compare the received position data with a trigger zone, triggering the server 102 to share digital reality application 110 content with the client devices 104 that have entered the trigger zone. The client devices 104 may be one or more mobile devices, personal computers, game consoles, media centers, and head-mounted displays, which are configured to enable interactions with users 106 and the digital reality application 110 content via user interfaces.

When the digital reality application 110 is virtually attached to an element of the real world such as a static object 112, the digital reality application 110 may, for example, be positioned or repositioned within a space in tandem with the object to which it is virtually attached, or be removed from or reintroduced into a space as the object to which it is attached is removed from or reintroduced into that space. Alternatively, the digital reality application 110 may be unattached or detached from an object to which it was virtually attached. If the digital reality application 110 is unattached, the application may be positioned in a space independent of the position of any object. If the digital reality application 110 is detached from an object to which it was virtually attached, the application may, for example, be removed from a space in which that object is still present, or remain in a fixed location that is independent of the location of that object, or move independently of that object.

A trigger zone can be calculated as a distance between a user and the virtual position where an application has been configured in the real world. For example, the trigger zone could be set for, e.g., from 10 to 30 meters around a location, object, or entity associated with an application. Alternatively the trigger zone can be set according to the field of view of the user, e.g., when the location, object, or entity associated with an application is in the field of view of the user, then the application may be triggered for that specific user. A field of view trigger zone may be independent of distance from the user. Alternatively, a trigger zone can also be an area defined by the field of hearing of a user (e.g., when a user cannot see a location, object, or entity associated with an application because it is hidden behind another object, but he could in theory hear any sounds from it). This type of trigger zone may be limited by distance but may also take into account any potential sound absorption by nearby materials or objects.

In the current disclosure, the term "static" is used to characterize objects that have a fixed position and orientation in the real world, and thus a corresponding fixed position and orientation input in the respective virtual replica in the persistent virtual world system. For example, the term "static" may be used to characterize objects in the real world that under typical conditions stay in the same location, such as the fountain, shoe and statue illustrated as static objects 112 in FIGS. 1A-1B. In some cases, a static object may correspond to a real-world object that is portable by nature but is expected to remain in place for an extended time. For example, the shoe 112 may be considered a static object when it is fixed in place or otherwise expected to remain in place (e.g., as a museum exhibit or as a promotional display in a retail store). In other cases, static objects correspond to real-world objects that by nature are not portable (such as the fountain and the statue). Such objects may remain in place except in rare situations, such as during remodeling of an area comprising the static objects. In such cases, the position and orientation of the displaced static objects may have to be updated manually or based on data obtained from cameras or other sources (e.g., optical data from cameras, radar data, and the like). Other examples of static objects may comprise natural formations, such as rocks, valleys, rivers, volcanoes, mountains, lakes, and trees.

In the current disclosure, the term "dynamic" is used to characterize objects that have a variable position and orientation in the real world, and thus a corresponding variable position and orientation in the virtual replica of the persistent virtual world system. For example, the term "dynamic" may be used to characterize objects in the real world that may normally be displaced from one area to another one, such as a car. Other example dynamic objects may be any type of moving vehicle, such as bicycles, drones, planes, and boats. In other examples, dynamic objects may also comprise living beings, such as humans and animals.

In the current disclosure, the term "virtual replica" refers to accurate and persistent virtual representations of real-world elements. In an embodiment, a virtual replica comprises data and models that provide self-computing capabilities and autonomous behavior. The data and models of the virtual replicas may be input through a plurality of software platforms, software engines, and sensors connected to real-world elements. Data are the attributes of the virtual replicas and the models are the graphical, mathematical and logic representations of any aspect of the corresponding real-world element that may be used to replicate the reality in the persistent virtual world system, such as 3D models, dynamic models, geometric models, and machine learning models.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location (e.g., in a server). In this way, virtual replicas, purely virtual objects and digital reality applications may interact and collaborate with each other when being configured for accomplishing specific goals even if users are not connected to the server.

"Self-computing capabilities", also referred to as "self-managing capabilities" refers herein to the ability of a virtual replica of the persistent virtual world system to apply artificial intelligence algorithms in order to autonomously manage computer resources (e.g., distributed computing resources). In an embodiment, virtual replicas with self-computing capabilities are able to autonomously manage computing resources to adapt to changes in the environment of corresponding real-world elements or in the real-world elements themselves. Thus, in an embodiment, each virtual replica may act autonomously depending on the conditions in the real world reflected in the persistent virtual world system, e.g., by allocating required resources, autonomously sending and executing commands and generating events as may be required by each circumstance. Achieving this type of behavior may require training the virtual replicas with artificial intelligence algorithms during the modeling of the virtual replicas. Thus, the role of a virtual replica editor may be limited to defining general policies and rules that guide the self-management process. For example, in the case of a car accident, the virtual replicas of autonomous vehicles close to the accident may decide to lower their speed or come to a stop in order to worsen traffic conditions, and notify the relevant authorities, before the passengers in the vehicle can even know that there was an accident.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

A pair of virtual-real twin, or twin-pair, comprises a real-world element and its corresponding virtual replica, or virtual twin, and can be considered as a Cyber-physical system or CPS. The CPS is an integration of computation with physical processes whose behavior is defined by both cyber and physical parts of the system. Therefore, a virtual replica is the cyber part of the CPS, while the physical part is the real world element. In an embodiment, the virtual replica may then be considered as an extension of the real twin that allows connecting the physical part with artificial intelligence and simulations to improve the object's capabilities and performance.

In some embodiments, users 106 may not need to download the digital reality application 110 in order for the applications to become visible or accessible to the user 106 and receive respective media streams 114 from the digital reality applications 110. Instead, the server 102 may directly retrieve application graphical representations to the user 106 from the server 102 and, if levels of interaction increase, perform remote computing and rendering for the client device 104, which may only need to perform lightweight computations in order to display the digital reality content. In other embodiments, the client device 104 may, after pre-determined levels of interaction, download the digital reality application 110 or parts of the digital reality application 110 and perform client computations and rendering.

In some embodiments, the digital reality application 110 content included in the media streams 114 includes at least one of the following: 3D image data, 3D geometries, 3D entities, 3D sensory data, 3D dynamic objects, video data, audio data, textual data, time data, positional data, orientational data, and lighting data.

In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas of the persistent virtual world system may be geolocated using a reference coordinate system suitable for use with current geolocation technologies. For example, the virtual replicas may use a World Geodetic System standard such as WGS84, which is the current reference coordinate system used by GPS.

According to an embodiment, the digital reality applications 110 may be developed via one or more third-party 3D engines, local 3D engines, or combinations thereof. Likewise, the virtual replicas where the digital reality applications 110 are virtually attached may be developed via a plurality of developers from one or more sources. As all the information is included in the server 102, the user 106 is able to view all applications and virtual replicas, independent of the development software used and the source of the developers. Therefore, a user 106 looking in one direction including a plurality of applications developed via different sources may view the plurality of applications and may be able to interact with them. Likewise, a user 106 may be able to view some or all of the interactions of other users 106 with respective applications, depending on the level of privacy desired or access entitlements and depth of the interactions.

In an embodiment, in order to reduce hardware and network demands, contribute to the reduction of network latency, and improve the general digital reality experience, the system 100 may connect through a network 108 including millimeter-wave (mmW) or combinations of mmW and sub 6 GHz communication systems, such as through $5^{th}$ generation wireless systems communication (5G). In other embodiments, a wireless local area networking (Wi-Fi) provides data at 60 GHz. Provided communication systems may allow for low (e.g., about 1 to about 5 millisecond end-to-end (E2E) latency and high (e.g., 1-10 Gbps) downlink speeds to end points in the field, complying with parameters necessary for executing the typically highly-interactive digital reality applications 110. This results in high-quality, low latency, real-time digital application content streaming. In other embodiments, the system 100 may communicatively connect through 4th generation wireless systems communication (4G), may be supported by 4G communication systems, or may include other wired or wireless communication systems.

As viewed in FIG. 1A, a plurality of users 106 may each view a different static object 112, each static object 112 having one or more digital reality applications 110 virtually attached. In the example of FIG. 1A, a fountain, a shoe, and a statue, are static objects 112 to which digital reality applications 110 may be virtually attached thereon, where each of the static objects 112 is beforehand modeled and stored in the server 102. Each user 106, when the field of view 116 comprises one static object 112, may view the respective static object 112 and digital reality application 110 corresponding to the viewing position and orientation of each user 106.

In another embodiment, as viewed in FIG. 1B, when the field of view 116 of a user 106 comprises a plurality of digital reality application 110, a single user 106 may be able to view the respective plurality of static objects 112 and digital reality applications 110 corresponding to the viewing position and orientation of the user 106. Thus, the user 106 may view the fountain, shoe, and statue and the digital reality applications 110 virtually attached respectively to each.

Figure 2A:
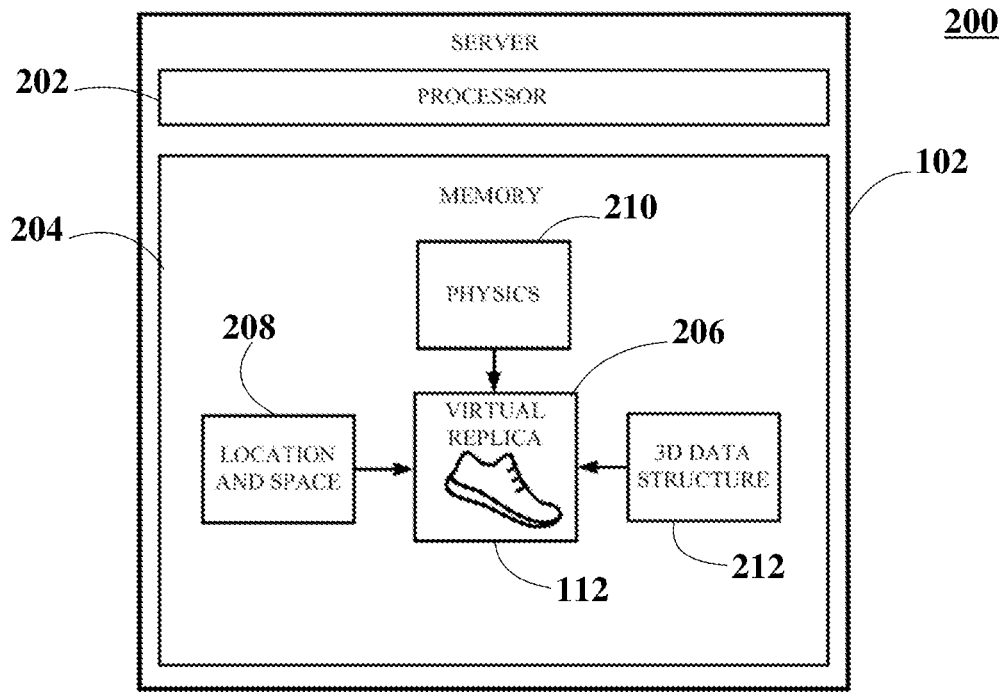
FIGS. 2A-2B depict schematic representations of a system for attaching applications and interactions to static objects, detailing the configuration of a virtual replica and attachment of an application to the virtual replica, according to an embodiment.
Figure 2B:
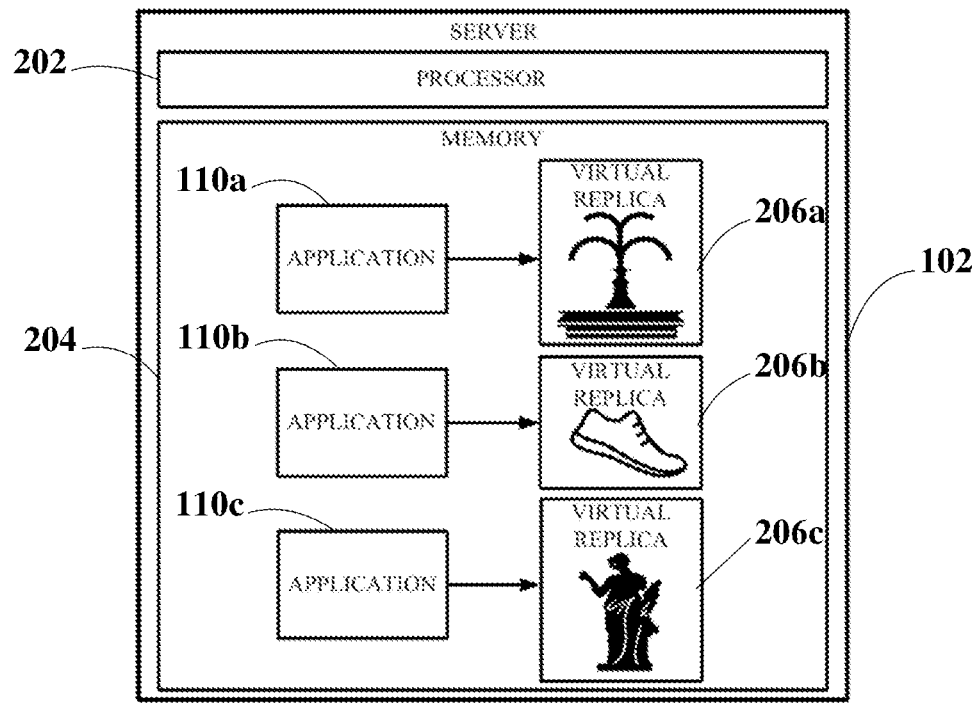

FIGS. 2A-2B depict schematic representations of a system 200 for attaching applications and interactions to static objects, detailing the configuration of a virtual replica and attachment of an application to the virtual replica, according to an embodiment. Some elements of FIG. 2A-2B may be similar to elements of FIGS. 1A-1B, and thus similar or identical reference numerals may be used to identify those elements.

System 200 comprises a server 102 including a processor 202 and a memory 204. The processor 202 is configured to execute instructions on data stored in the memory 204. As viewed in FIG. 2A, the memory 204 contains a database with structured data containing a persistent virtual world system storing virtual replicas 206 of static objects selected among real-world elements, the virtual replicas 206 comprising the location and space 208, physics settings 210, and 3D data structure 212, amongst others, based on the corresponding static objects 112.

Virtualizing the real world before attaching the digital reality applications 110 to corresponding static objects allows application developers to utilize the location including position and orientation of the virtual replicas. In addition, effects such as collisions and occlusion between static objects and digital elements may be enabled in a more realistic way, as each real-world element is stored as a virtual replica in the server 102. For example, digital reality applications 110 may be occluded by real-world objects because the virtual replicas corresponding to the real-world objects may prevent a user 106 from viewing the digital reality applications 110, enabling a realistic effect. Likewise, as the real world is virtualized, collision effects between an application or a virtual element and a real-world object are enabled, creating a realistic effect.

The location and space 208 are configured to allow setting up the location, relative three-dimensional position and orientation, and scaling of virtual replicas 206. Configuration of physics 210 enables the specification of physical properties of the virtual replicas 206, such as rigid body dynamics, soft body physics, fluid dynamics, occlusion, and collision detection, amongst others. The 3D data structure 212 refers to a data organization and storage format of 3D objects that enables efficient access and modification, including, for example, octrees, quadtrees, BSP trees, sparse voxel octrees, 3D arrays, and k-d trees.

The system 200, as viewed in FIG. 2B, enables application developers to attach digital reality applications 110, such as digital reality applications 110*a-c* on respective virtual replicas 206*a-c*.

According to an embodiment, the virtual replicas 206 are created via readily-available CAD models of the static objects. For example, machine owners may provide an administrator of the persistent virtual world system or may input by themselves the already-existing digital CAD or CAE models of their machines. Similarly, building owners may provide building information models (BIM) with building details to be stored in the persistent virtual world system, which may include information that may not be visible or easily obtainable via sensing mechanism. In other embodiments, the modeling tools enable a car or drone-based image-scanning pipeline to be input through a variety of photo, video, depth simultaneous location and mapping (SLAM) scanning in order to model the virtual replicas 206. In other embodiments, radar-imaging, such as synthetic-aperture radars, real-aperture radars, Light Detection and Ranging (LIDAR), inverse aperture radars, monopulse radars, and other types of imaging techniques may be used to map and model static objects before integrating them into the persistent virtual world system. Utilizing these more technical solutions may be performed especially in cases where the original models of the structures are not available, or in cases where there is missing information or there is a need to add additional information to the virtual world entities which is not provided by the CAD or CAE models.

Figure 3A:
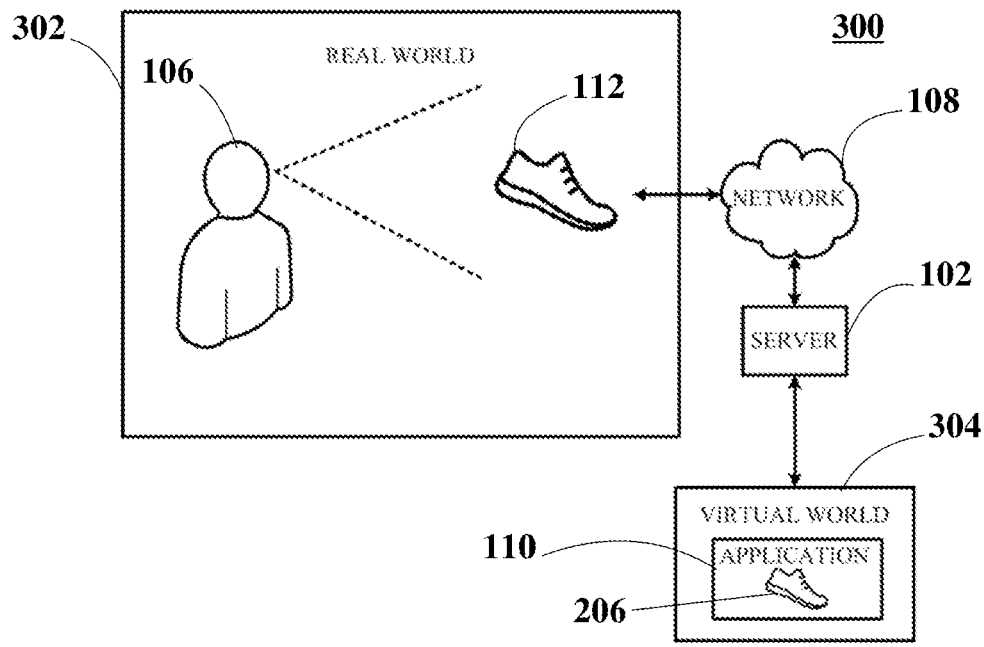
FIGS. 3A-3B depict schematic representations of a system for attaching applications and interactions to static objects, detailing the connection between a real world, virtual world, and merged world, according to an embodiment.
Figure 3B:
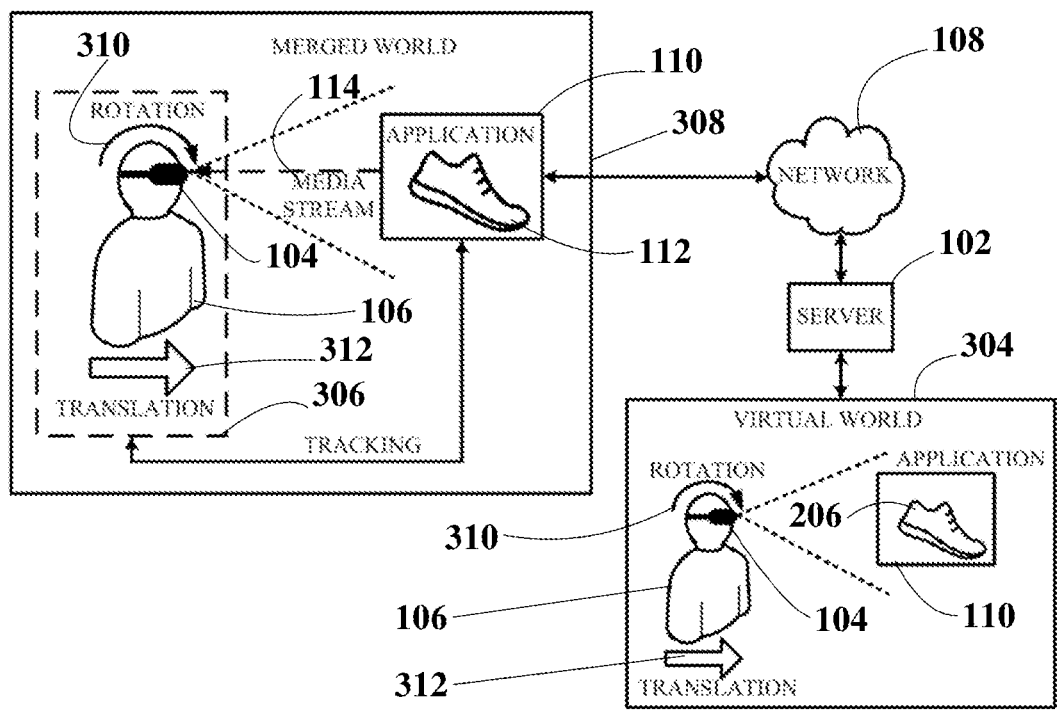

FIGS. 3A-3B depict schematic representations of a system 300 for attaching applications and interactions to static objects, detailing the connection between a real world, virtual world, and merged world, according to an embodiment. Some elements of FIGS. 3A-3B may be similar to elements of FIGS. 1A-2B, and thus similar or identical reference numerals may be used to identify those elements.

The digital reality applications 110 are virtually attached to one or more static objects 112 in the real world 302 via the virtual replicas 206 stored in the virtual world 304. Thus, as viewed in FIG. 3A, a user 106 not wearing or employing a client device 104 may approach the real-world location where the digital reality application 110 is virtually attached without triggering any reaction in the system 300 and without the user 106 being able to view the digital reality application 110. At this moment, a virtual world 304 developed based on the real world 302 may include only information of the static objects 112 and digital reality applications 110 thereon attached.

On the other hand, as viewed in FIG. 3B, when the user 106 activates and employs a client device 104, the digital reality application 110 may detect and perform tracking 306 of the viewing position and orientation of the client device 104 and may retrieve corresponding media streams 114 from the server 102, which are adjusted in order to be aligned with the user viewing position and orientation during user interaction. Detecting a client device 104 activates a merged world 308, whereby the movement of the user 106 in the real world 302 is registered in real-time in the virtual world 304. The tracking 306 may, for example, include tracking the rotation 310 and translation 312 of a user's movements, which may be necessary in order to adjust the viewing position and orientation of the media streams 114 delivered to the client device 104.

According to an embodiment, the digital reality applications 110 may utilize one or more of a plurality of techniques to broadcast a signal to the client devices 104, alerting the client devices 104 that a digital reality application 110 is available in proximity to the location of the client devices 104. In one embodiment, if the user 106 has previously subscribed to an application in the server 102, the location of the client device 104 may then at all times be available at the persistent virtual world system stored in the server 102. Therefore, when a user 106 approaches a digital reality application 110, the digital reality application 110 may already prepare to broadcast the signals to the client device 104. In another embodiment, if the user 106 has previously subscribed to the server 102 or to one or more specific digital reality applications 110 from the server 102, the digital reality application 110 may constantly search for registered devices prior to broadcasting the signal. In one embodiment, as a user 106 with a client device 104 enters a location where the digital reality application 110 is active, the digital reality application 110 may detect a signal from the client device 104, indicating the device can receive a digital reality application 110 media stream prior to broadcasting the signal.

As way of example, the digital reality application 110 is virtually attached to a static shoe placed in a specific place in a park. Without the client device 104, the user 106 may only view a shoe, but when the user employs the client device 104, the user 106 may view a digital reality application 110 that may be represented by the shoe glowing or emitting a sound. The user 106 may be alerted by the digital reality application 110 about the presence of the digital reality application 110 and the user 106 may thereafter touch a virtual, graphical representation of the same, which may trigger other forms of interaction. For example, after the user 106 touches the graphical representation of the digital reality application 110, the graphical representation may increase in size, may enable the user 106 to rotate the shoe, view the shoe characteristics in the form of text, view videos about the shoe, change some characteristics of the shoe, such as color, size, or style, and may purchase the selected shoe. The shoe may remain in the specific place in the park or elsewhere until decided by the shoe provider, and may thereafter move the shoe to another place, for which the shoe location and space settings may need to be updated in the server 102. In other examples, the shoe may be viewed completely in virtual reality, such as showing the shoe in a different setting, such as in a desert, mountain, or another city.

Figure 4:
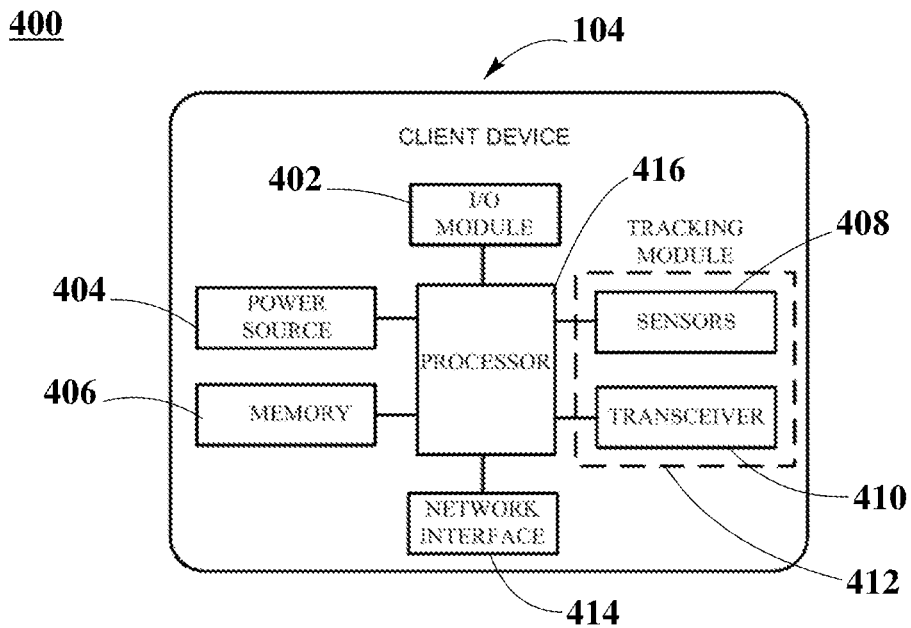
FIG. 4 depicts a schematic representation of a system for attaching applications and interactions to static objects, detailing operational components of a client device, according to an embodiment.

FIG. 4 depicts a schematic representation of a system 400 for attaching applications and interactions to static objects, detailing operational components of a client device, according to an embodiment.

A client device 104 may include operational components such as an input/output (I/O) module 402; a power source 404; a memory 406; sensors 408 and transceivers 410 forming a tracking module 412; and a network interface 414, all operatively connected to a processor 416.

The I/O module 402 is implemented as computing hardware and software configured to interact with users and provide user input data to one or more other system components. For example, I/O module 402 may be configured to interact with users, generate user input data based on the interaction, and provide the user input data to the processor 416 before being transferred to other processing systems via a network, such as to a server. In another example, I/O modules 402 is implemented as an external computing pointing device (e.g., a touch screen, mouse, 3D control, joystick, gamepad, and the like) and/or text entry device (e.g., a keyboard, dictation tool, and the like) configured to interact with client devices 104. In yet other embodiments, I/O module 402 may provide additional, fewer, or different functionality to that described above.

The power source 404 is implemented as computing hardware and software configured to provide power to the client devices 104. In one embodiment, the power source 404 may be a battery. The power source 404 may be built into the devices or removable from the devices, and may be rechargeable or non-rechargeable. In one embodiment, the devices may be repowered by replacing one power source 404 with another power source 404. In another embodiment, the power source 404 may be recharged by a cable attached to a charging source, such as a universal serial bus ("USB") FireWire, Ethernet, Thunderbolt, or headphone cable, attached to a personal computer. In yet another embodiment, the power source 404 may be recharged by inductive charging, wherein an electromagnetic field is used to transfer energy from an inductive charger to the power source 404 when the two are brought in close proximity, but need not be plugged into one another via a cable. In another embodiment, a docking station may be used to facilitate charging.

The memory 406 may be implemented as computing hardware and software adapted to store application program instructions. The memory 406 may be of any suitable type capable of storing information accessible by the processor 416, including a computer-readable medium, or other medium that stores data that may be read with the aid of an electronic device, such as a hard-drive, memory card, flash drive, ROM, RAM, DVD or other optical disks, as well as other write-capable and read-only memories. The memory 406 may include temporary storage in addition to persistent storage.

The sensors 408 may be implemented as computing hardware and software adapted to obtain data from the real world. In some embodiments, one or more of the sensors 408 may determine/track the position and orientation of the client devices 104 and send that information to the server to determine the position and orientation of the client device. For example, the sensors 408 may include one or more cameras, such as one or more depth cameras. The sensors may also include one or more Inertia Measuring Units (IMUs), accelerometers, and gyroscopes. The IMU is configured to measure and report the velocity, acceleration, angular momentum, speed of translation, speed of rotation, and other telemetry metadata of client devices 104 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 410 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 410 may be a two-way communication transceiver 410.

In an embodiment, the tracking module 412 may be implemented by combining the capabilities of the IMU, accelerometers, and gyroscopes with the positional tracking provided by the transceivers 410 and the accurate tracking, low-latency and high QOS functionalities provided by mmW-based antennas may enable sub-centimeter or sub-millimeter positional and orientational tracking, which may increase accuracy when tracking the real-time position and orientation of client devices 104. In alternative embodiments, the sensing mechanisms and transceivers 410 may be coupled together in a single tracking module device.

The network interface 414 may be implemented as computing software and hardware to communicatively connect to a network, receive computer readable program instructions from the network sent by the server or by client devices 104, and forward the computer readable program instructions for storage in the memory 406 for execution by the processor 416.

The processor 416 may be implemented as computing hardware and software configured to receive and process data from sensing mechanisms and digital reality application data and instructions. For example, the processor 416 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 416 may receive user input data from I/O module 402 and may respectively implement application programs stored in the memory 406. In other examples, the processor 416 may receive data from sensing mechanisms captured from the real world, or may receive an accurate position and orientation of client devices 104 through the tracking module 412, and may prepare some of the data before sending the data to a server for further processing. In other examples, the processor 416 may perform edge-based rendering of media streams received from the server while executing the digital reality applications. In other examples, the processor 416 may receive media streams rendered by the server, and may perform lightweight operations on the media streams in order to output the media streams.

Figure 5:
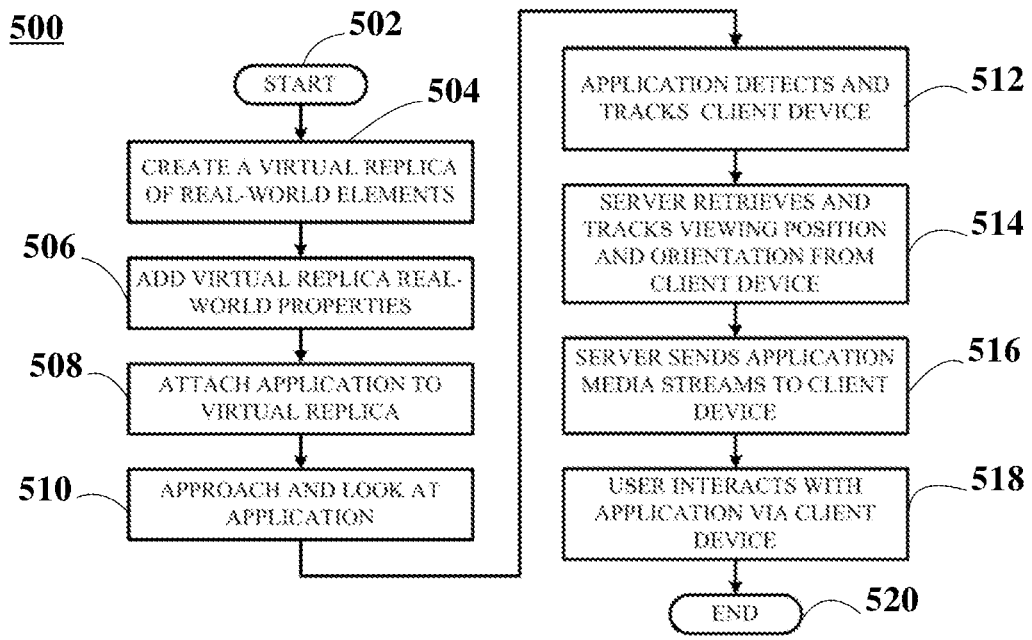
FIG. 5 depicts a schematic representation of a method for attaching applications and interactions to static objects, according to an embodiment.

FIG. 5 depicts a block diagram of a method 500 for attaching applications and interactions to static objects, according to an embodiment. Method 500 may be implemented by a system, such as systems described with reference to FIGS. 1A-4.

According to an embodiment, a method 500 for attaching digital reality applications and interactions to static object starts in blocks 502 and 504 by creating, by a developer via a replica editor stored in a server, virtual replicas of static objects selected amongst real-world elements. Subsequently, method 500 continues in block 506 by adding virtual replica real-world properties, including location and space settings, physics settings, and 3D data structure. Then, in block 508, the method 500 continues by attaching, by a developer via a replica editor stored in the server, digital reality applications to the virtual replicas.

In block 510, the method 500 continues by a user approaching and looking at a digital reality application. In some embodiments, the user may approach the digital reality application in a merged reality. In other embodiments, the user may approach the digital reality application in virtual reality. Approaching the digital reality application triggers the digital reality application to detect and track the client device position and orientation, and to send the client position and orientation to the server, as viewed in block 512. In block 514, the server retrieves and tracks the viewing position and orientation from client device, and then, in block 516, sends application media streams to the client device adjusted and aligned to the viewing position and orientation of the user. Finally, in blocks 518 and 520, the user interacts with the digital reality application via the client device.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
one or more servers comprising a memory and a processor;
wherein the one or more servers contain a persistent virtual world system storing virtual replicas of static objects of the real world, the static objects of the real world having fixed positions and orientations in the real world, the virtual replicas comprising a static object location and space and physics settings that specify physical properties of the virtual replicas, wherein the persistent virtual world system is configured to virtually attach digital reality applications on the virtual replicas, such that as a client device approaches a location or object to which a digital reality application is virtually attached, the digital reality application detects the physical position and orientation of the client device, triggering the one or more servers to transmit digital reality application content to the client device, and wherein the one or more servers are configured to detect a level of interaction with the digital reality application increasing to a predetermined level of interaction and trigger a download of the digital reality application or a portion thereof by the client device upon detection of the level of interaction with the digital reality application increasing to the predetermined level of interaction.

2. The system of claim 1, wherein the digital reality application content is presented in real reality, merged reality, or virtual reality.

3. The system of claim 1, wherein interactions with the digital reality applications are personal or shared with other client devices.

4. The system of claim 1, wherein the virtual replicas are created via computer vision techniques, computer-assisted drawings, computer-assisted engineering models, or combinations thereof.

5. The system of claim 4, wherein the computer vision techniques comprise car or drone-based image-scanning through photo, video, depth measurements, simultaneous location and mapping (SLAM) scanning, or radar-imaging techniques, or a combination thereof.

6. The system of claim 1, wherein the digital reality application content is streamed directly by the one or more servers to the client device and, as levels of interaction increase, the client device performs local computations and rendering.

7. The system of claim 1, wherein the digital reality application content comprises 3D image data, 3D geometries, 3D dynamic objects, video data, audio data, textual data, time data, positional data, orientational data, haptic data, or lighting data, or a combination thereof.

8. The system of claim 1, wherein the client device comprises a combination of inertia measuring units and transceivers that enable sub-centimeter or sub-millimeter tracking of the client device.

9. The system of claim 8, wherein the transceivers are millimeter-wave transceivers configured to wirelessly receive mmW radio waves from antennas and to send the data back to the antennas.

10. The system of claim 8, wherein the tracking is performed through time of arrival (TOA), angle of arrival (AOA), visual imaging, GPS, or radar technology, or a combination thereof.

11. A method comprising:
by a server computer system comprising a memory and a processor, providing a persistent virtual world system storing virtual replicas of static objects of the real world, the static objects of the real world having fixed positions and orientations in the real world, the virtual replicas comprising a static object location and space and physics settings that specify physical properties of the virtual replicas; and
virtually attaching digital reality applications to the virtual replicas, such that as a client device approaches a location or object to which a digital reality application is virtually attached, the digital reality application detects the physical position and orientation of the client device, triggering the server computer system to transmit digital reality application content to the client device;
detecting a level of interaction with the digital reality application increasing to a predetermined level of interaction; and
triggering a download of the digital reality application or a portion thereof by the client device upon detection of the level of interaction with the digital reality application increasing to the predetermined level of interaction.

12. The method of claim 11 further comprising:
creating, via a replica editor stored in a server, virtual replicas of the static objects selected from the real world; and
virtually attaching, via the replica editor stored in the server, digital reality applications to the virtual replicas.

13. The method of claim 11 further comprising:
retrieving and tracking, by a server, the physical position and orientation of the client device; and
sending, by the server, the digital reality application content to the client device.

14. The method of claim 11, wherein the digital reality application content is presented in real reality, merged reality, or virtual reality.

15. The method of claim 11, wherein interactions with the digital reality applications are personal or shared with other client devices.

16. The method of claim 11, wherein the virtual replicas are created via computer vision techniques, computer-assisted drawings or computer-assisted engineering models, or combinations thereof.

17. The method of claim 16, wherein the computer vision techniques comprise car or drone-based image-scanning through photo, video, depth measurements, simultaneous location and mapping (SLAM) scanning, or radar-imaging techniques, or a combination thereof.

18. The method of claim 11, wherein the digital reality application content is streamed directly by the server computer system to the client device and the client device performs local computations and rendering.

19. The method of claim 11, wherein the digital reality application content comprises 3D image data, 3D geometries, 3D dynamic objects, video data, audio data, textual data, time data, positional data, orientational data, haptic data, or lighting data, or a combination thereof.

20. The method of claim 11, wherein the client device comprises a combination of inertia measuring units and transceivers that enable sub-centimeter or sub-millimeter tracking of the client device.

* * * * *